Feb. 28, 1939.   W. TOBIAS   2,148,594
CALCULATING MECHANISM
Filed Feb. 16, 1934
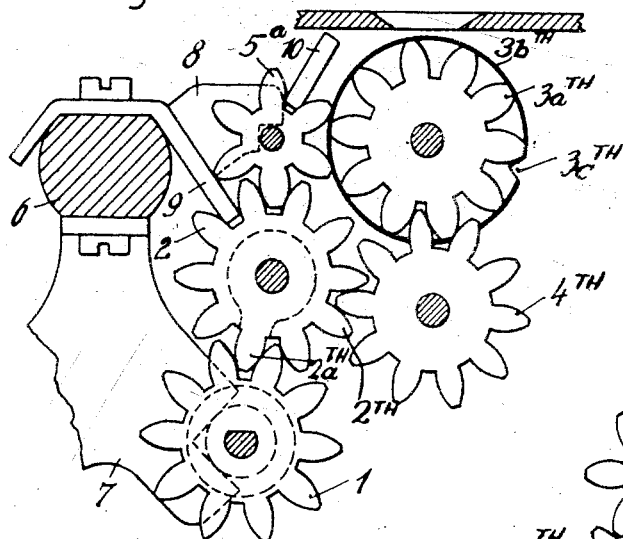
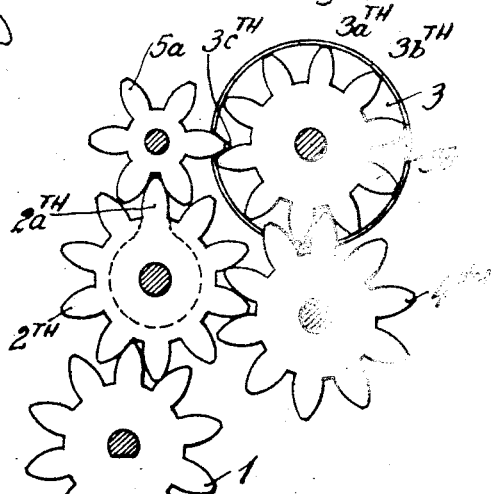
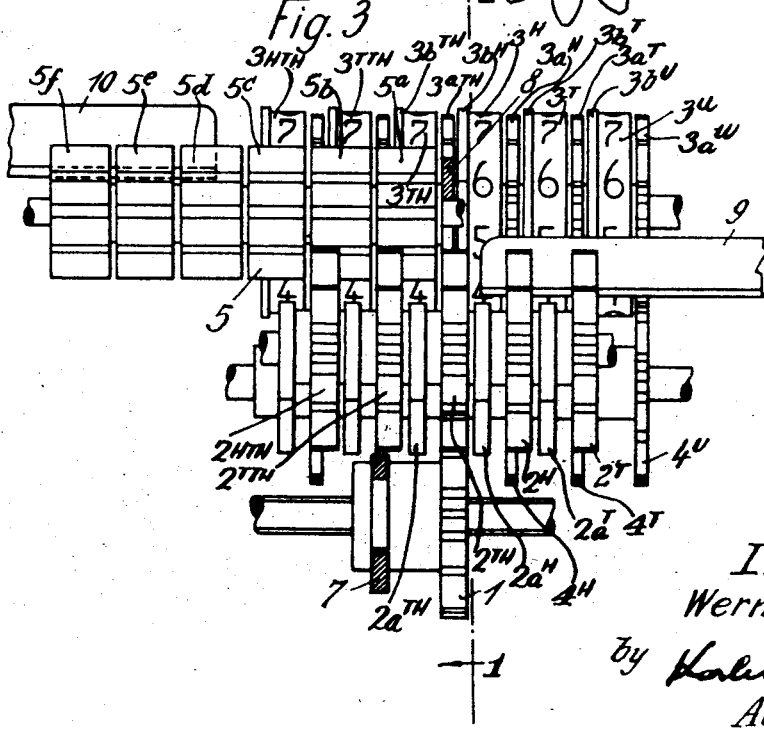
Inventor:
Werner Tobias
by Kalikinhauer
Atty.

Patented Feb. 28, 1939

2,148,594

UNITED STATES PATENT OFFICE

2,148,594

CALCULATING MECHANISM

Werner Tobias, Berlin-Sudende, Germany, assignor to Olympia Büromaschinenwerke Aktiengesellschaft, Erfurt, Germany Application February 16, 1934, Serial No. 711,573

1 Claim. (Cl. 235—139)

My invention relates to calculating mechanisms, more particularly of the kind in which sets of calculating wheels are provided, each comprising a digit wheel and a tens transmission wheel.

It is an object of my invention to improve calculating mechanisms of such type in such manner that the tens transmission can be performed easily even in cases where the transmission must be carried through a high number of digits.

My invention is particularly adapted for calculating mechanisms in which a calculating actuating wheel is displaced stepwise by means of a sliding member and in which coupling members are provided which are displaced simultaneously with the actuating wheel and establish the connection between the calculating sets situated at the left of the set being in engagement with the actuating wheel and corresponding to higher digits than the last mentioned set. The invention is equally applicable to mechanism in which the actuating wheel and the coupling members are stationary, the calculating sets being displaced relative to them.

In calculating mechanisms of this kind difficulties have been experienced in switching through, in the tens transmission, a larger number of digits, say above seven, for instance twelve. The difficulties are caused partly by the unavoidable play between the several transmitting members which must be arranged to run easily and to be readily displaceable with respect to each other in the direction of the longitudinal axis of the mechanism. The difficulties result in the last transmitting members lagging, whereby the mechanism is checked unless additional devices are provided for compensating this lag or for expediting the last part of the rotary displacement.

Further difficulties are caused by the frictional pressure arising between the several transmitting members and their axles. With a large number of digits the resistances resulting from these pressures will be so high that it becomes altogether impossible to switch through all the digits. These resistances are especially increased by additional spring-loaded ratchet and setting means engaging the transmitting member or the rotating members, for instance the digit wheels, not directly provided with tens transmission teeth, or segments provided for limiting the oscillations of certain members.

These expedients hitherto proposed to overcome these difficulties, such as the use of shafts of small diameters, the use of finer circular pitches, the polishing of the teeth or the like, involve drawbacks in other respects and do not completely overcome the difficulties referred to.

It is an object of my invention to lower the inner rotational resistance in calculating mechanisms of the type referred to and to obtain that a higher number of digits can be switched through even in a plurality of counting mechanisms by means of keys which can easily be operated by hand.

In order to accomplish this I omit all spring-loaded members and provide for each calculating set only two transmitting members, one of these members forming the drive for a digit wheel, while the second member forms a coupling member and is enabled to simultaneously operate, without the provision of additional members, as a ratchet-means for the tens transmission and as a means for adjusting the wheels of the calculating mechanism to calculating position.

In a preferred embodiment of my invention the transmitting members are designed as simple spur-wheels, the transmitting member driving the digit wheel being provided with a tens transferring tooth rigidly connected to the wheel, while the other transmitting member, forming a coupling member displaced step by step simultaneously with the actuating wheel and connecting the transmission tooth of one set with the tens transmission wheel of the next set, slides with two teeth on the circumference of the digit wheel which is formed with a recess coming into engagement with a tooth of the coupling wheel when the digit wheel passes through zero. In consequence thereof the coupling wheel, the tens transferring wheel in engagement therewith and the rotating digit wheel are aligned and secured in their correct positions. The axles on which the wheels run, may have small diameters. Preferably the digit wheels are provided with circumferential ridges on which the teeth of the coupling wheels slide, in order to prevent the teeth of the coupling wheels from damaging the surfaces of the digit wheels carrying the digits.

I wish it to be understood that the term "tens transmission" includes any transmission from lower digits to the next higher ones and may be replaced for instance by a twelves transmission or a twenties transmission.

In the drawing affixed to this specification and forming part thereof mechanism embodying my invention is illustrated diagrammatically by way of example, merely those portions being shown which are essential for the understanding of the invention.

In the drawing

Fig. 1 is a cross section of part of the mechanism taken along the lines I—I of Fig. 3 and showing the wheels of a calculating set, the actuating wheel and a coupling wheel and the members for displacing the movable wheels.

Fig. 2 is a similar view showing the wheels in position for a tens transmission, the displacing means for the actuating wheel and the coupling wheels being omitted.

Fig. 3 is a partial front view of the section showing a plurality of calculating sets, the right hand end tens transmission wheel being broken away for the sake of clearness.

The mechanism illustrated in the drawing comprises a plurality of calculating sets arranged in a well known manner in parallel to each other and corresponding to the units, tens, hundreds and so on, respectively, the parts of which are designated in Fig. 3 by the indices U, T, H and so on, respectively. Each calculating set comprises a digit wheel such as $3^U$ carrying on its circumference the numbers from 0 to 9 and being rigidly connected to a gear such as $3a^U$ arranged on its right in Fig. 3, a tens transmission wheel such as $2^T$ carrying at its left side a tens transmission tooth such as $2a^T$, and an intermediate wheel such as $4^U$ being in engagement with both the gear $3a^U$ of the digit wheel $3^U$ and the tens transmission wheel $2^T$. 1 is the actuating wheel which may be displaced by means of a sliding member 6 provided with a plate-like member 7 by means of which the movement of the sliding member 6 is transmitted to the actuating wheel 1. The actuating wheel can be brought into engagement with any of the tens transmission wheels 2. In Fig. 3 the actuating wheel 1 is shown in engagement with the tens transmission wheel $2^{TH}$ of the fourth calculating set, numbering from the right. 5 are coupling wheels which are displaced simultaneously with the actuating wheel 1 by means of another plate-like member 8 secured to the sliding member 6. The coupling wheels 5 are so arranged that the right end wheel $5a$ will couple the tens transmission tooth ($2a^{TH}$ in Fig. 3) connected to the tens transmission wheel ($2^{TH}$ in Fig. 3) engaged by the actuating wheel 1 with the tens transmission wheel ($2^{TTH}$ in Fig. 3) of the set to the left of it, as will be seen from Fig. 3. The same figure shows that the coupling wheels 5 couple with each other all the calculating sets at the left of the set being in engagement with the actuating wheel, these elements being (in Fig. 3) the elements $2^{TTH}$, $3^{TTH}$, $2^{HTH}$, $3^{HTH}$. As will be seen from Figs. 1 and 2, the digit wheels 3 are formed with circumferential recesses $3c$ coming into engagement with the coupling wheels in the manner to be described hereinafter. 9 is a strip-shaped member rigidly connected to the sliding member 6 and arranged so as to lock against rotation the wheels of the sets at the right of the actuating wheel. 10 is a locking bar rigidly secured to the casing (not shown) of the device and locking against rotation the coupling wheels which are not in engagement with any of the calculating sets (the three coupling wheels $5d$, $5e$, $5f$ in Fig. 3).

The operation of the device is as follows:

The actuating wheel 1 is shifted into the desired position by means of the sliding member 6, the coupling wheels 5 being simultaneously displaced so that they couple pairwise the calculating sets to the left of the actuating wheel 1. Be it assumed that the digit wheel $3^{TH}$ of the set engaged by the actuating wheel 1 is in a position which does not correspond to a tens transmission, as shown in Fig. 1, then the tens transmission recess $3c^{TH}$ of this set is out of engagement with the coupling wheel $5a$ engaging the tens transmission wheel $2^{TTH}$ of the next set. This coupling wheel however slides with two teeth on the circumference of the digit wheel $3^{TH}$ of the calculating set engaged by the actuating wheel 1. In order to prevent the numbers provided on the digit wheels from being damaged by the sliding teeth of the coupling wheels, each digit wheel is provided with a circumferential ridge $3b$, on which slide the teeth of the coupling wheels and in which the recess $3c$ is formed. When the digit wheel 3 of any of the calculating sets passes through zero, the associated wheels are in the position shown in Fig. 2, in which the tens transmission tooth $2a^{TH}$ of the set engages the coupling wheel $5a$ and a tooth of the latter engages the recess $3^{TH}$, so that the tens transmission wheel of the next set is rotated through an angle which suffices for rocking the digit wheel $3^{TTH}$ of the set. After the carrying out of a tens transmission the recess $3c^{TH}$ is disengaged from the tooth of the coupling wheel $5a$ and at the same time the tens transmission tooth $2a^{TH}$ is disengaged from the coupling wheel $5a$, so that a position similar to that shown in Fig. 1 is reached, in which the coupling wheel $5a$ slides with two teeth on the circumferential ridge $3b^{TH}$ of the digit wheel.

The key mechanism for actuating the actuating wheel 1 is well known in the art and not shown in the drawing, since it does not form part of my invention.

As will be seen from the drawing and the preceding description, the circumferential ridge $3b$ of any digit wheel 3 locks the associated coupling wheel 5 and the other wheels, directly or indirectly in engagement therewith, against overthrowing and simultaneously holds the wheels in correct calculating position. The correct position of the coupling wheels 5 brought into engagement with the outermost calculating set on the left by means of the sliding member is secured by means of the locking bar 10. The correct position of the coupling wheels which are displaced by means of the sliding member from one calculating set to the next one on the right is secured during their displacement by means of the tens transmission wheels, the correct position of which is secured by means of the actuating wheel 1 and by means of the coupling wheels which are already in engagement with the calculating sets. Thus all the wheels of the mechanism are secured in their correct positions, not only in calculating position but also in any intermediate position, without employing any additional member, and quite particularly any spring-loaded members.

The tens transmission proper is performed merely by means of the transmitting members 2 and 5. In consequence thereof even with a high number of digits only a relatively small number of clearances between the wheels are added to each other. For instance in a mechanism comprising 12 counting sets, since the last element has no tens transmission, a complete tens transmission merely contains 22 clearances, while in mechanism comprising four transmitting members the number of clearances added to each other would be 44. A similar advantage is involved with respect to the pressures caused by axial friction. Since no transmitting and running members are spring-loaded and since members running under no load merely exert a small check, only the check must be overcome which is produced by pure transmitting pressures, such checks occurring only at a limited extent, since the number of transmitting members is very low and the diameters of the axles may be made very small.

It should be understood that my invention is not limited to hand-operated mechanisms, but may advantageously be used in power driven mechanisms. It involves not only a safe running without checking, but also lower costs of production owing to the small number and simple shape of the individual sets.

I wish it to be understood that I do not desire to be limited to the exact details of construction shown and described, for obvious modifications will occur to a person skilled in the art.

I claim:—

A calculating mechanism comprising in combination, a plurality of calculating wheels arranged in sets, an actuating wheel arranged for cooperation with each set of calculating wheels and for stepwise axial displacement from one set to the other, coupling wheels axially displaceable together with said actuating wheel, each coupling wheel being associated with one of said sets of calculating wheels, each set comprising a tens transmission wheel arranged to operate the set corresponding to the higher order by means of the set of the lower order, a digit wheel, an intermediate wheel arranged to couple each digit wheel with a tens transmission wheel for operation of said digit wheel, a tens transferring tooth rigidly fixed to each tens transmission wheel, said coupling wheels coupling the tens transferring tooth of the lower order with the tens transmission wheel of the higher order, two teeth of a coupling wheel being applied against the circumference of the digit wheel of the lower order, thereby locking against rotation the wheels of the higher order, when the tens transferring tooth of this latter order is not in engagement with the coupling wheel associated to it, and arranged to adjust said wheels of the higher order into operative position to permit axial movement of said actuating wheel, each digit wheel being formed with a peripheral notch allowing the passage of a tooth of the corresponding coupling wheel, when said digit wheel is rotated to pass through zero, means, arranged to be shifted axially in accordance with said actuating wheel, for aligning and locking those sets of wheels, which are not yet in gear with said actuating wheel, and stationary means for aligning and locking the coupling wheels which are not yet included in the operation.

WERNER TOBIAS.